Oct. 21, 1969   C. L. PRITCHARD ET AL   3,473,763
DECELERATOR CANOPY AND AEROSTAT ENVELOPE
Filed Dec. 29, 1967
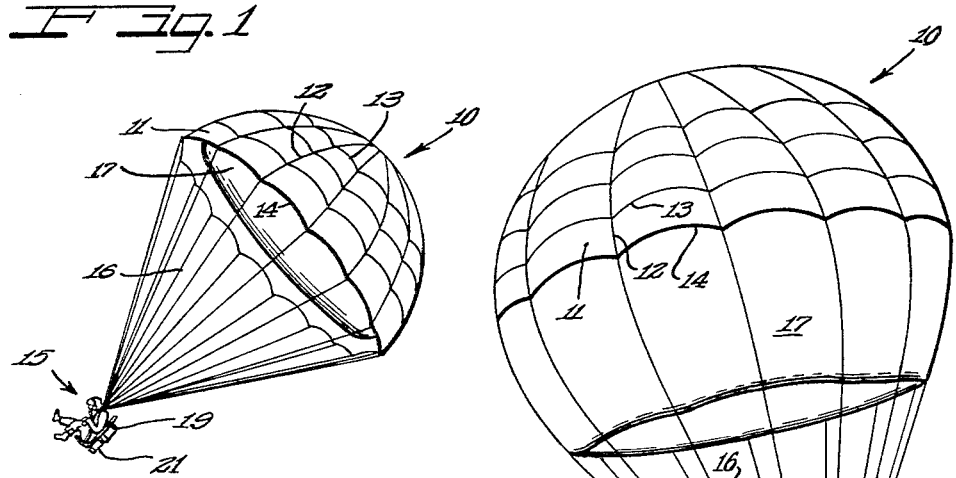
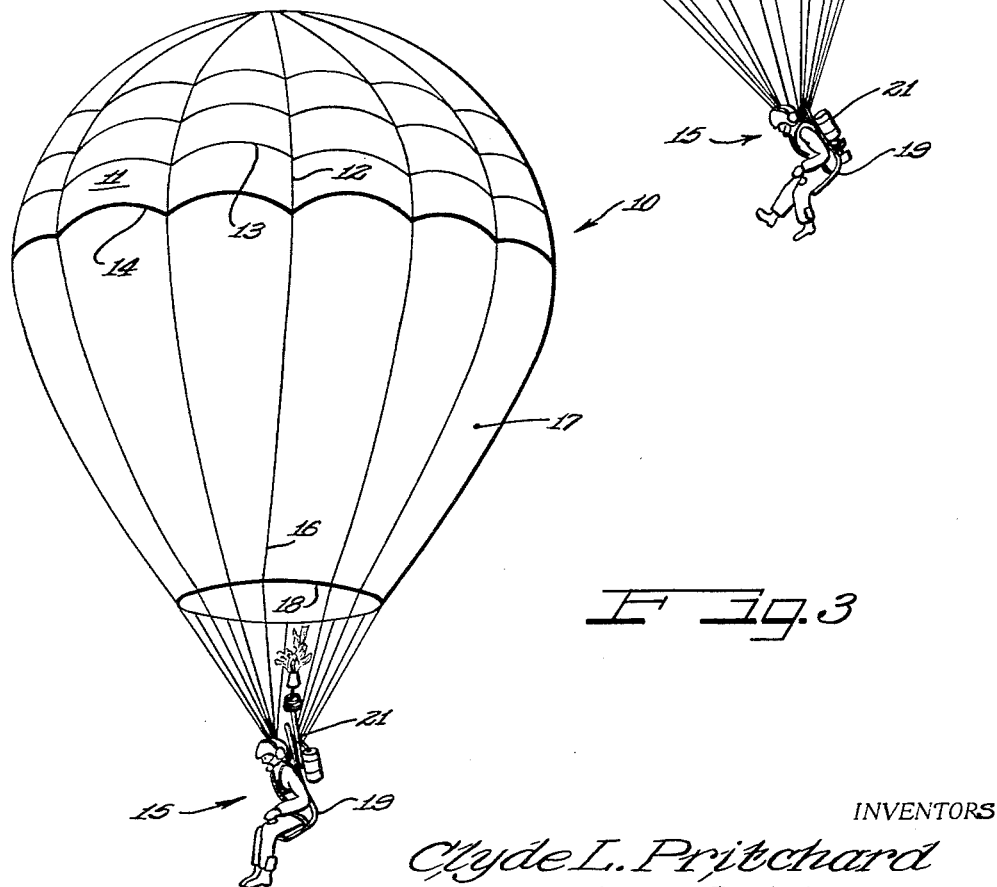
INVENTORS
Clyde L. Pritchard
Russell A. Pohl
BY Hill, Sherman, Meroni, Gross & Simpson   ATTORNEYS

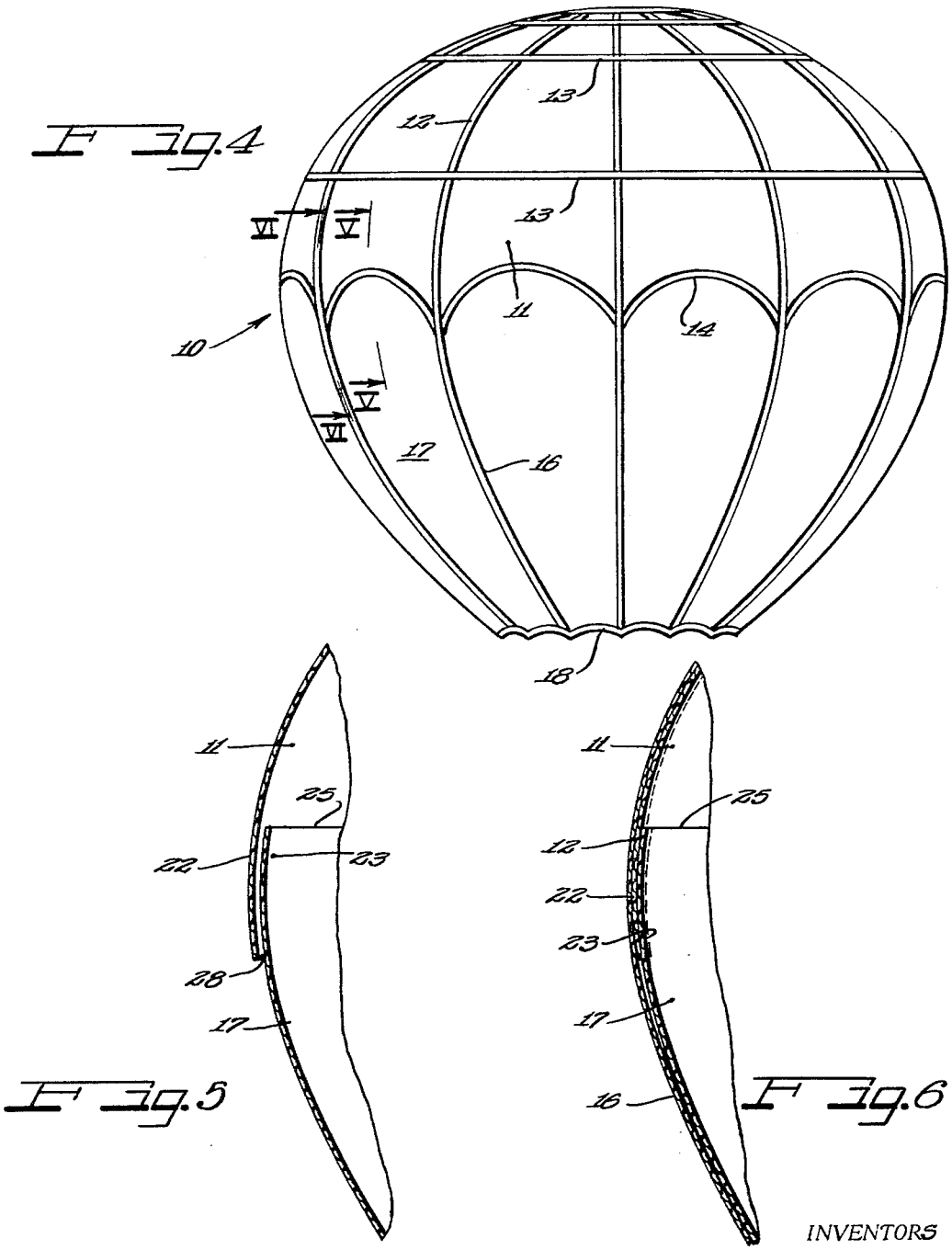

United States Patent Office 3,473,763
Patented Oct. 21, 1969

3,473,763
DECELERATOR CANOPY AND AEROSTAT
ENVELOPE
Clyde L. Pritchard and Russell A. Pohl, Sioux Falls,
S. Dak., assignors to Raven Industries, Inc., Sioux
Falls, S. Dak., a corporation of South Dakota
Filed Dec. 29, 1967, Ser. No. 694,698
Int. Cl. B64c 17/00; B64b 1/40
U.S. Cl. 244—142                                     6 Claims

ABSTRACT OF THE DISCLOSURE

A decelerator canopy and aerostat envelope which is capable of decelerating and supporting a user while descending from an aircraft, initially as a parachute structure and secondarily as an aerostat envelope which may in the preferred embodiment include an air heating system so as to sustain buoyancy to allow the user to remain aloft as long as desired.

The copending application entitled "Pilot Aerial Survival System" discloses a system which uses the decelerator canopy and aerostat envelope of this invention.

BACKGROUND OF THE INVENTION

Field of the invention

This invention relates to the field of aerodynamics and in particular to supporting and recovering systems for supporting and safely lowering personnel and material from aircraft.

Description of the prior art

Parachutes of various types have been known, wherein personnel and material may be safely lowered at a controlled velocity by canopies collected by shroud lines to the users and material. It has also been known to utilize balloon structures of either the lighter-than-air or hot-air types.

SUMMARY OF THE INVENTION

The present invention relates to a decelerating canopy and aerostat envelope of a novel structure which comprises thin material in combination with shroud lines, and which when first deployed, takes the shape of a parachute of generally hemispherical shape with the shroud lines connecting from the supporting envelope down to the user or material. At approximately the equator of the parachute structure are loosely attached material which initially extends up into the internal concave structure of the parachute, but which as the descent continues, gradually emerges from the concave interior of the parachute to form an aerostat envelope. The aerostat envelope is attached about the periphery of the parachute portion and extends down and engages the shroud lines as it assumes the aerostat envelope shape. An opening is formed above the user or material being lowered, which may be utilized to insert heated air with a suitable burner carried by the material or user so as to convert the decelerating structure into a sustaining structure so that the user or material may be sustained as long as desired. Inflation scoops are formed about the edge of the parachute portion adjacent the connection point of the lower shroud and increase the efficiency of inflation of the envelope. The completed structure allows the user to safely eject from aircraft of high speeds or other type, decelerate himself to a safe descent speed in the parachute mode and then the aerostat envelope shape is assumed by the structure. The user may then turn on his air heater or alternatively this may be done automatically such that the aerostat functions as a hot air balloon to sustain him above the ground or even to accomplish an ascent if desired. These features allow the operator to operate the balloon as a sailing free balloon and thus select his point of landing when desired, or alternatively he may be recovered by an air-to-air pickup, as for example by helicopter or other aircraft engaging his supporting canopy in the air and then hoisting him into the aircraft.

Such structures, of course, would avoid a pilot from having to land in enemy territory if he incurred trouble over such terrain, or alternatively if the pilot must eject over water or very rough terrain, he may take a better location. For example, if a pilot incurred engine difficulty over the Rocky Mountains in a remote area, he could actually come down and perish in twenty or thirty foot snow banks in some of the remote areas, without being located. The present invention would allow such a pilot to utilize the buoyancy features of this invention and drift over the Rockies, and land on a flat plateau in a populated and accessible area.

Other objects, features and advantages of this invention will become apparent from the following description when taken in conjunction with the accompanying drawings.

BRIEF DESCRIPTION OF THE DRAWINGS

FIGURE 1 illustrates the structure of this invention which has been deployed and is still in the parachute configuration.

FIGURE 2 illustrates the invention wherein the lower envelope forming portion of the aerostat is starting to descend.

FIGURE 3 illustrates the invention with the lower aerostat forming portion completely descended and with the user sustaining altitude with a burner.

FIGURE 4 is a plan view of the aerostat of this invention showing the construction.

FIGURE 5 is a detailed view through the connection point between the parachute and lower envelope portion on line V—V of FIGURE 4.

FIGURE 6 is a detailed sectional view on line VI—VI of FIGURE 4.

DESCRIPTION OF THE PREFERRED EMBODIMENT

FIGURE 1 illustrates the auto-converting canopy-to-envelope apparatus of this invention designated generally as 10, in which a pilot 15 has ejected or otherwise exited from an aircraft. A parachute portion 11 is attached to a plurality of shroud lines 12 which have lower portions 16 that extend down and attach to the pilot's chair 19, to which the pilot is firmly attached. A burner mechanism 21 is also attached to the chair 19 to provide heat for supporting the invention after it has assumed its aerostat envelope shape. The upper panels of the parachute 11 are sewn and are otherwise attached to the shroud lines 12. Attached to the shroud lines in an overlapped area between the parachute portion and the envelope portion is an aerostat-forming envelope 17. The envelope 17 is packed within the parachute portion 11 and when the apparatus is ejected initially the parachute 11 is filled with air and the device assumes the configuration shown in FIGURE 1. The envelope 17 is sewn to the shroud lines and envelope only along the shroud lines 12 and thus air can pass upwardly between the lower edge of the parachute panels 11 and the envelope 17. Such air may cause the envelope to come downwardly to form the aerostat configuration or the opening in the bottom may cause it to descend. FIGURE 2 for example, illustrates wherein the envelope 17 has started to descend from out of the confines of the parachute and the envelope is about half-deployed.

FIGURE 3 illustrates the aerostat configuration at a time subsequent to that shown in FIGURE 2, wherein the envelope 17 has moved to the full down position such that its lower edge 18 terminates above the pilot 15. It is to be realized that the envelope 17 is not attached to the lower portion 16 of the shroud lines 12, but the shroud lines 16 hold it in a ballon configuration.

FIGURES 4, 5 and 6 show the detailed construction of the aerostat envelope comprising the parachute and the lower panel 17. It is to be noted that strengthening and grappling lines or ribbons 13 are also attached to the parachute portion of the apparatus as shown in FIGURES 1 through 4. In FIGURE 4, the shroud lines 12 with their lower portions 16 are formed of ribbon or strap material rather than lines, although it is to be realized that the invention is not limited to such construction. The parachute portion 11 is attached along its contact surface with the shroud line 12 to below the hemisphere line of the parachute. The lower panel 17 which is formed between each of the lower portions of the shroud line 16 is not connected to the shroud lines 16, but is attached to the shroud lines only in the overlapped portion designated by the areas 22 and 23 in FIGURES 5 and 6, and in this area only in the portion under the shroud line 12. For example, note in FIGURE 5 that the lower panel 17 has an overlapped portion 23 which extends upwardly into the parachute 11. The upper end of the envelope 17 is designated as 25, however the lower panel 17 has its overlapped portion 23 firmly sewn to the overlapped portion 22 of the parachute and the shroud lines 12 where the shroud line passes over the parachute and portion 23 as shown in FIGURE 6. A lower strap 18 is shown around the lower portion of the aerostat 10 in FIGURE 4 and the cargo or personnel supporting lines which might for example be cables are not shown. It is to be realized however, that they would attach to the lower portion 16 of the shroud straps and to a cargo ring to which the cargo would be attached. In operation, the pilot ejects from an aircraft, for example, and the parachute portion is deployed as shown in FIGURE 1. This serves as a substantial decelerating device and operates as a normal decelerating canopy. The aerostat shape will be assumed due to the lowering of the panel 17 as the air passes up between the parachute portion 22 and the lower panel portion 23 through the opening 28, as shown in FIGURE 5. This may cause the lower canopy portion 17 to descend to assume the configuration shown in FIGURE 3 or the opening in the bottom may cause it to descend. The pilot may then pivot his heater 21 up as shown in FIGURE 15, and manually or automatically ignite it so as to heat air within the aerostat 10. By controlling the fuel to his heater, the pilot may regulate his rate of ascent or descent or may hover at a predetermined desired altitude. A heater similar to that shown in Patent No. 3,096,048 might be used for example as the heater 21. When the pilot desires to descend, he can turn off his heater 21 and descend in normal manner.

We claim:

1. A pilot aerial survival system comprising a decelerator canopy and aerostat envelope normally packed and worn by an aircraft occupant, said decelerating canopy and aerostat envelope initially assuming a parachute shape and then forming an aerostate envelope, shroud lines passing over and attached to said canopy, support means attached to the downwardly extending ends of said shroud lines and said aircraft occupant supported thereby, said aerostate envelope attached to said decelerating canopy at selected areas less than the complete periphery and only at each shroud line so that the decelerator canopy and aerostat envelope are attached together at each shroud line and the remaining portions are not connected, and the lower portion of said aerostat envelope not connected to said shroud lines.

2. Apparatus according to claim 1 wherein the decelerator canopy and the aerostat envelope overlap.

3. Apparatus according to claim 1 wherein said shroud means are flexible straps.

4. Apparatus according to claim 1 wherein said shroud means are lines.

5. Apparatus according to claim 1 wherein the portion of the aerostat envelope which is adjacent the parachute portion is larger than the portion which is remote from the parachute portion.

6. Apparatus according to claim 5 wherein an opening is formed in the portion which is remote from the parachute portion.

References Cited

UNITED STATES PATENTS

| | | | |
|---|---|---|---|
| 1,562,258 | 11/1925 | Russell | 244—145 |
| 3,154,268 | 10/1964 | Struble | 244—32 |

MILTON BUCHLER, Primary Examiner

T. W. BUCKMAN, Assistant Examiner

U.S. Cl. X.R.

244—32